May 7, 1946.  D. E. GARR ET AL  2,399,918
TEST SYSTEM
Filed Nov. 13, 1943
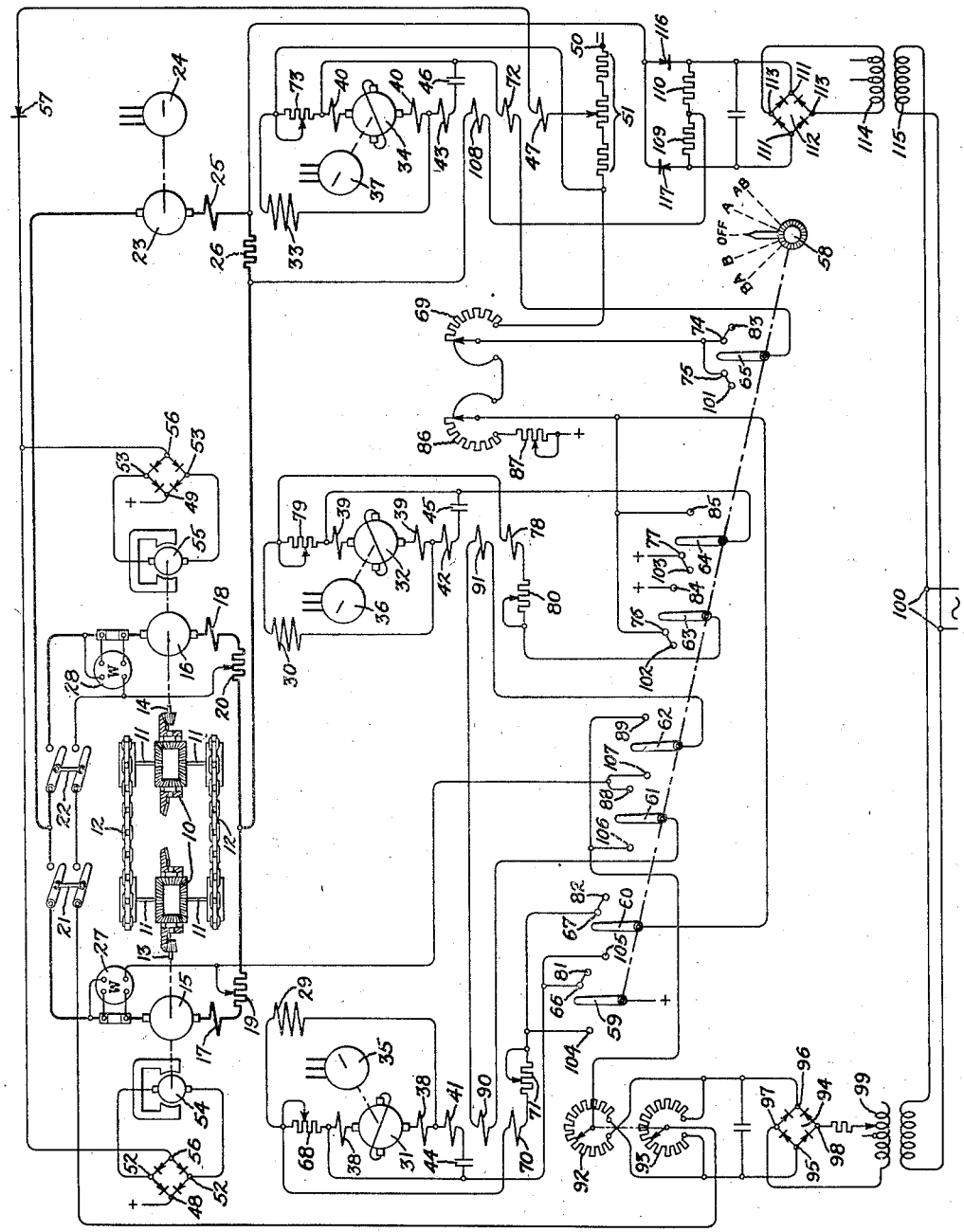
Inventors:
Donald E. Garr,
Burr S. Weaver,
by Harry E. Dunham
Their Attorney.

Patented May 7, 1946

2,399,918

UNITED STATES PATENT OFFICE 2,399,918

TEST SYSTEM

Donald E. Garr, Schenectady, and Burr S. Weaver, Scotia, N. Y., assignors to General Electric Company, a corporation of New York Application November 13, 1943, Serial No. 510,235

16 Claims. (Cl. 73—162)

Our invention relates to test systems for testing mechanical drives such as gear differentials and transmissions.

An object of our invention is to provide an improved test system for simultaneously testing a plurality of mechanical drives.

Another object of our invention is to provide an improved test system for testing a pair of mechanical drives such as differential gears and for pumping back the power developed by one mechanical drive into the machine which drives the other mechanical drive, thereby increasing the efficiency of the system.

Further objects and advantages of our invention will become apparent and our invention will be better understood from the following description referring to the accompanying drawing, and the features of novelty which characterize our invention will be pointed out with particularity in the claims annexed to and forming part of this specification.

The drawing is a schematic illustration of an embodiment of our improved test system.

Referring to the drawing, we have shown a pair of mechanical drives, each including a differential gear drive 10 which is to be tested. The output shafts 11 of these differential drives on each side of each unit are mechanically connected together by any suitable driving arrangement, such as a belt or chain drive 12 for transmitting power therebetween. The input or transmission shafts 13 and 14 of these two gear drives are mechanically connected respectively to the armatures of dynamoelectric machines 15 and 16. These dynamoelectric machines are provided with commutating field exciting windings 17 and 18 and are connected in parallel with each other through resistors 19 and 20 and across a common source of electric power supply through contactors 21 and 22. This common source of electric power supply is a main generator having an armature 23 adapted to be driven at a substantially constant speed by a suitable prime mover such as an electric motor 24. The armature 23 is connected across both dynamoelectric machines 15 and 16 through a main generator commutating field exciting winding 25 and a resistor 26. The power developed or absorbed by the dynamoelectric machines connected to the gear drives is indicated by watt meters 27 and 28 which have their current coils connected in series with the dynamoelectric machine armatures 15 and 16 and their voltage coils connected across the dynamoelectric machines and a part of the resistors 19 and 20, respectively. The dynamoelectric machines 15 and 16 are provided with control field exciting windings 29 and 30 which are energized by amplidyne exciters 31 and 32. If the fields 29 and 30 are maintained exactly equal, each dynamoelectric machine will drive its transmission and differential at some predetermined speed, depending upon the voltage of the generator 23. As long as the excitations provided by the field exciting windings 29 and 30 are substantially equal and constant, both machines will tend to run at the same speed and no power will be transmitted through the gear drives. If the excitation of one of the control field exciting windings is weakened such that the other field exciting winding provides a higher excitation to its respective dynamoelectric machine, the machine with the higher excitation will tend to run slower than the machine with the weaker excitation, and mechanical power will be transmitted through the gears from the machine with the weakened field to the machine with the higher excitation, thus transmitting mechanical power through the gear drives. With such an arrangement, the machine with the higher excitation will become a generator, and electric power will be pumped back and transmitted from it to the driving dynamoelectric machine with the weaker field, and the losses of the system will be provided by the main generator 23. This provides for a very efficient utilization of this test system.

In order to assure rapid response and to provide the desired control features to the machines, various field exciting windings are provided to the amplidyne exciters 31 and 32 and the main generator 23 is provided with a main control field exciting winding 33 which is energized from an amplidyne exciter 34. All of the amplidyne exciters are of the type machine described in Patent 2,227,992, Alexanderson and Edwards, January 7, 1941, assigned to the assignee of this application, and all of these exciters are adapted to be driven at substantially constant speeds by suitable motors 35, 36, and 37. The amplidyne exciters 31, 32, and 34 are provided with the usual type compensating field exciting windings 38, 39, and 40, respectively, which are connected in series with the armature to compensate or neutralize the load current component of armature reaction. These amplidyne exciters also are provided with conventional stabilizing or anti-hunt field exciting windings 41, 42, and 43, connected through condensers 44, 45, and 46 across the exciters 31, 32, and 34, respectively. These stabilizing field exciting windings are energized only under transient conditions and provide a component of excitation in a direction which tends to dampen out the transient condition in the exciter. It is desirable to limit the speed of operation of the dynamoelectric machines 15 and 16 to a predetermined safe maximum value. This is obtained by arranging a speed limiting field exciting winding 47 on the main exciter 34 which is adapted to be deenergized for all values below the predetermined maximum speed value and to provide a differential component of excitation to the exciter 34 which will tend to lower the voltage of this exciter and thereby lower the excitation provided by the field exciting winding 33 to the main generator 23 when the speed of either machine 15 or 16 exceeds a predetermined value. When the field exciting winding 47 causes a decrease in the excitation of the main generator 23, the ability of this generator to supply the losses of the driving system including the gear drives and the dynamoelectric machines is reduced such that the machines slow down as the energy is absorbed by the uncompensated losses and the speed of the test system is maintained within safe operating values. This exciter field exciting winding 47 is energized by being connected across a voltage marked "+" on terminals 48 and 49 of full wave rectifiers and marked "—" on terminal 50 of a resistor 51. Diametric terminals 52 and 53 of the full wave rectifiers are connected respectively to speed responsive voltages generated by tachometer generators 54 and 55 which are mechanically coupled to the dynamoelectric machines 15 and 16 and are adapted to be driven in a predetermined speed relationship to the speed of these two machines, respectively. The two full-wave rectifiers are connected in parallel and in opposition to the separate source of power supply across the field exciting winding 47 by having their terminals 56 connected together to a terminal of the field exciting winding 47, such that when the speed responsive voltage of either of the tachometer generators exceeds the voltage of the separate source of supply, a current will flow through the field exciting winding 47 to provide the desired differential component of excitation to the main exciter 34. Reverse energization of the field exciting winding 47 is prevented at speeds below the predetermined maximum speed by a unidirectional valve or rectifier 57 which is connected in series with the winding and permits energizing current to flow only when the voltage of the tachometer generators exceeds the voltage of the external source.

It is also desirable to vary the amount of loading of the mechanical drives and to reverse the direction of operation of the gears to test the gear mesh for both directions of rotation, and under some conditions it may also be desirable to operate only one of the dynamoelectric machines 15 or 16 without operating the other machine. In order to provide this type operation, a manually operable selective control 58 is arranged to control the energization of control field exciting windings of the amplidyne exciters 31, 32, and 34. This includes a plurality of contactors 59, 60, 61, 62, 63, 64, and 65 which are adapted to close circuits for simultaneously reversing the direction of excitation provided by the control field exciting windings or selectively to energize only one or the other of the control field exciting windings of the amplidyne exciters 31 or 32, respectively. The energization of the control field exciting windings is provided by an external source of electric power supply which is indicated by + and — signs in the drawing and excitation is removed from all of the control field exciting windings in the position of the manual selective control 58 shown in the drawing. If only the exciter for the dynamoelectric machine 15 is to be energized, the controller is turned to the first position on the right indicated at A in the drawing, in which position the contactor 59 is closed on contact 66 and contactor 60 is closed on contact 67, which places the external voltage across a potentiometer 68 connected in series with the exciter 31 and through resistors 69 and 51 in series with a field exciting winding 70 adapted to control the voltage of the amplidyne exciter 31. The energization of the field exciting winding 70 also is manually controllable by a rheostat 71 connected in series with this winding. In this position of the selective control, the contactors 61, 62, 63, and 64 do not connect with any contact, and, therefore, the control field exciting windings of the amplidyne exciter 32 are deenergized. With such an arrangement, the main circuit switch 22 of the dynamoelectric machine 16 also should be opened. Energization of the dynamoelectric machine 15 is provided by the main generator 23, and the main generator field exciting winding 33 is energized by the amplidyne exciter 34, which is excited by its various field exciting windings, including a control field exciting winding 72. This field exciting winding is energized by the difference of the voltage across a resistor 73 in series with the amplidyne exciter armature 34 and the voltage from an external source through the adjustable resistor 69, as the contactor 65 of the selective control is closed on contact 74. With this arrangement, the external voltage is compared to the potentiometer drop, that is, these two voltages are connected in opposition to each other and across the field exciting winding 72. The control excitation provided by this field exciting winding 72 can be regulated by varying the resistance of the rheostat 69 and also by varying the voltage compared to the external voltage by changing the setting of the potentiometer 73. In this manner, the voltage of the main generator 23 is controlled by the control of the excitation provided by its field exciting winding 33 through control of its energizing current.

Operation of only the dynamoelectric machine 16 can be obtained by turning the selective control 58 to its first position towards the left in the drawing, indicated by B, in which position the main exciter field exciting winding 72 is energized as before by the closing of the contactor 65 on the contact 75 which is electrically connected in the same circuit as the contact 74. In this position, the contacts 59, 60, 61 and 62 are deenergized and do not connect with any electrical contacts. However, the contactors 63 and 64 are closed on contacts 76 and 77, respectively, and energize a control field exciting winding 78 on the exciter 32 in the same manner as the field exciting winding 70 of the exciter 31, as described above. In this arrangement, the field exciting winding 78 is connected across a variable potentiometer 79 connected in series with the armature of the exciter 32 and across the external source of electric power supply through the rheostat 69 and the resistance 51 and may include rheostat 86. The energization of this field exciting winding 78 also is manually controllable to a small extent by a rheostat 80 connected in series with this winding to provide better regulation to this field winding.

Operation of both of the dynamoelectric machines 15 and 16 can be obtained from either of the first two positions A or B of the selective controller 58 by moving to either of the extreme positions on the right or left, indicated by AB and BA, respectively. In the position AB, the contactor 59 is closed on a contact 81 and the contactor 60 is closed on a contact 82 which energizes the field exciting winding 70 in the same manner as when the selective controller 58 is in the position A. The contactor 65 is closed on a contact 83 which energizes the main exciter control field exciting winding 72 in the same manner as when the selective controller is in the position A. The contactors 63 and 64 are closed on contacts 84 and 85 which reverses the energization of the field exciting winding 78 from the energization provided when the selective controller 58 is in its position B and the energization of this field exciting winding 78 is also controllable by the resistors 86 and 87 in this position, such that the voltage of the exciter 32 is reversed from the voltage of this exciter when a selective controller is in the position B. In this position of the selective controller 58, the contactors 61 and 62 are closed on contacts 88 and 89 which connect the voltage of the main generator 23 across control field exciting windings 90 and 91 of the exciters 31 and 32, respectively, through manually controllable rheostats 92 and 93 through the contacts of the contactors 21 and 22 in opposition to an external voltage through a full-wave rectifier 94. This is obtained by connecting the terminals of the rheostats 92 and 93 across diametric terminals 95 and 96 of the full-wave rectifier 94 and by connecting the external voltage across the other diametric terminals 97 and 98 through a variable potential transformer 99, the primary of which is connected across a source of alternating current at 100. With this arrangement, the voltage of either exciter 31 or 32 can be varied at will by varying the position of the rheostats 92 and 93 to provide more or less excitation to one or the other of the exciters 31 or 32. Thus, either of the dynamoelectric machines 15 or 16 can be made to act as a motor or a generator, depending upon the amount of excitation provided thereto as controlled by the excitation of the field exciting windings 29 and 30 as a function of the control of the rheostats 92 and 93. The connections of the field exciting windings 90 and 91 also provide a safe maximum current limit to the dynamoelectric machines 15 and 16, as the voltage across the diametric terminals 95 and 96 of the rectifier 94 is proportional to the drop across the resistors 19 and 20, which is proportional to the load current of the machines 15 and 16. By varying the amount of the resistances 19 and 20, the maximum load current of the machines 15 and 16 can be varied as if it exceeds a predetermined amount. The excitation of the field exciting windings 90 and 91 will oppose the excitation of the main control field exciting windings 70 and 78, respectively, thereby decreasing the net excitation and, therefore, the voltage of the exciters 31 and 32. This would reduce the excitation provided by the field exciting windings 29 and 30 and produce a lower voltage and load current for the dynamoelectric machines 15 and 16, respectively, thereby limiting the current through these machines to the desired maximum value.

The dynamoelectric machines 15 and 16 may be operated in the reverse direction by turning the selective control 58 to its extreme left position BA, in which case, contactor 65 is closed on the contact 101 and the field exciting winding 72 of the main exciter is energized in the same manner as described heretofore. The contactors 63 and 64 are closed on contacts 102 and 103, respectively, to energize the control field exciting winding 78 of the exciter 32 in the same manner as explained above when the selective controller is in the position B. In this position, the contactors 59 and 60 are closed on contactors 104 and 105 and energize the control field exciting winding 70 of the exciter 31 in the reverse direction from that explained above when the selective controller 58 is in its position A. In addition, the contactors 61 and 62 are closed on contacts 106 and 107 and energize the control field exciting windings 90 and 91 of the exciters 31 and 32 in the opposite direction from that explained above for the position of the selective controller 58 in its position AB, thereby reversing the excitation provided to the dynamoelectric machine field exciting windings 29 and 30 by the exciters 31 and 32, respectively.

It has been found desirable to limit the current supplied by the main generator 23 to a predetermined maximum safe operating value, and this is obtained by arranging a field exciting winding 108 to provide a differential component of excitation to the main exciter 34 above a predetermined value of current supplied by the main generator 23. This field exciting winding 108 is connected across the resistor 26 and across an external voltage through a bridge formed of two resistor arms 109 and 110 connected across diametric terminals 111 of a full-wave rectifier 112. The other diametric terminals 113 of the full-wave rectifier 112 are connected across the secondary 114 of a transformer, whose primary winding 115 is connected to the alternating current source of electric power supply 100. The terminals 111 of the full-wave rectifier are connected across the resistors 109 and 110 and to the resistance 26 through one-way rectifiers 116 and 117 which prevent a short circuit of the full-wave rectifier 112 and permit the flow of current through the winding 108 only in one direction, so as to permit the energization of this current limiting field exciting winding only when the voltage drop across the resistor 26 exceeds the drop provided across the resistor arm 110.

In this manner, the dynamoelectric machines 15 and 16 may be operated independently of each other or both may be operated together in either direction of rotation, so as to reverse the rotational direction of the transfer of mechanical power through the mechanical drives, and either machine may be operated as a motor or as a generator when both machines are in operation. This provides a very versatile control and a very efficient utilization of the power of the system.

While we have illustrated and described a particular embodiment of our invention, modifications thereof will occur to those skilled in the art. We desire it to be understood, therefore, that our invention is not to be limited to the particular arrangement disclosed, and we intend in the appended claims to cover all modifications which do not depart from the spirit and scope of our invention.

What we claim as new and desire to secure by Letters Patent of the United States is:

1. In a test system for testing a pair of mechanical drives connected together for transmitting power therebetween, a pair of dynamoelectric machines each adapted to be mechanically connected to one of said mechanical drives, means for electrically connecting both of said machines across a source of electric power supply, a field exciting winding for each of said dynamoelectric machines, means for controlling the excitation provided by said field exciting windings for operating one of said dynamoelectric machines at a higher excitation than the other of said dynamoelectric machines for driving said higher excitation machine by said other machine, said electrical connecting means of said machines to said electrical power supply providing for an electrical pump-back of power from said driven machine to said other machine and for supplying the losses of the system from said electrical power supply, and means for simultaneously reversing the direction of rotation of the mechanical drives by simultaneously reversing the excitation of said machines.

2. In a test system for simultaneously testing a pair of gear drives connected together for transmitting power therebetween, a pair of dynamoelectric machines each adapted to be mechanically connected to one of said gear drives, means for electrically connecting both of said machines across a source of electric power supply, a field exciting winding for each of said dynamoelectric machines, means for controlling the excitation provided by said field exciting windings for operating one of said dynamoelectric machines at a higher excitation than the other of said dynamoelectric machines for driving said higher excitation machine by said other machine, said electrical connecting means of said machines to said electrical power supply providing an electrical pump-back of power from said driven machine to said other machine and for supplying the losses of the system from said electrical power supply, means for simultaneously reversing the direction of rotation of said gear drives by simultaneously reversing the excitation of said machines and also for selectively energizing said field exciting winding of only one of said dynamoelectric machines, and speed responsive means for limiting the speed of said machines to predetermined values by limiting the supply of power from said electrical power supply.

3. In a test system for testing a pair of mechanical drives connected together for transmitting power therebetween, a pair of dynamoelectric machines each adapted to be mechanically connected to one of said mechanical drives, means for electrically connecting both of said machines across a source of electric power supply, a field exciting winding for each of said dynamoelectric machines, means for controlling the excitation provided by said field exciting windings for operating one of said dynamoelectric machines at a higher excitation than the other of said dynamoelectric machines for mechanically driving said higher excitation machine by said other machine through the mechanical drives, said electrical connecting means of said machines to said electrical power supply providing for an electrical pump-back of power from said driven machine to said other machine and said electrical power supply supplying the losses of the system, and means for simultaneously reversing the direction of rotation of said mechanical drives by simultaneously reversing the excitation of said machines and also for selectively energizing either one or both of said field exciting windings of said machines.

4. In a test system for testing a pair of mechanical drives connected together for transmitting power therebetween, a pair of dynamoelectric machines each adapted to be mechanically connected to one of said mechanical drives, means for electrically connecting both of said machines across a source of electric power supply, a field exciting winding for each of said dynamoelectric machines, means for controlling the excitation provided by said field exciting windings for operating one of said dynamoelectric machines at a higher excitation than the other of said dynamoelectric machines for mechanically driving said higher excitation machine by said other machine through the mechanical drives, said electrical connecting means of said machines to said source of electrical power supply providing for an electrical pump-back of power from said driven machine to said other machine and said electrical power supply supplying the losses of the system, means for measuring the electrical power of each of said machines, and means for simultaneously reversing the direction of rotation of said mechanical drives by simultaneously reversing the excitation of said machines and also for selectively exciting either one or both of said machines.

5. In a test system for testing a pair of mechanical drives connected together for transmitting power therebetween, a pair of dynamoelectric machines each adapted to be mechanically connected to one of said mechanical drives, means for electrically connecting both of said machines to a source of electric power supply, a field exciting winding for each of said dynamoelectric machines, means for controlling the excitation provided by said field exciting windings for operating one of said dynamoelectric machines at a higher excitation than the other of said dynamoelectric machines for driving said higher excitation machine by said other machine through said mechanical drives, said electrical connecting means of said machines to said electrical power supply providing for an electrical pump-back of power from said driven machine to said other machine and for supplying the losses of the system from said electrical power supply, selective means for simultaneously reversing the direction of rotation of said mechanical drives by simultaneously reversing the excitation of said machines, and means including a field exciting winding for said machines for controlling the loading on said machines.

6. In a test system for testing a pair of mechanical drives connected together for transmitting power therebetween, a pair of dynamoelectric machines each adapted to be mechanically connected to one of said mechanical drives, a generator, means for electrically connecting both of said machines across said generator, a field exciting winding for each of said dynamoelectric machines, means for controlling the excitation provided by said field exciting windings for operating one of said dynamoelectric machines at a higher excitation than the other of said dynamoelectric machines for mechanically driving said higher excitation machine by said other machine through the mechanical drives, said electrical connecting means of said machines across said generator providing for an electrical pump-back of power from said driven machine to said other machine and said generator supplying the losses of the system, means for simultaneously reversing the excitation of said machines, means including an exciter for exciting said generator, and means including a field exciting winding for providing a differential component of excitation to said exciter above a predetermined current supplied by said generator for limiting the generator current to a predetermined maximum value.

7. In a test system for testing a pair of mechanical drives connected together for transmitting power therebetween, a pair of dynamoelectric machines each adapted to be mechanically connected to one of said mechanical drives, a main generator, means for electrically connecting both of said machines across said main generator, a field exciting winding for each of said dynamoelectric machines, means for controlling the excitation provided by said field exciting windings for operating one of said dynamoelectric machines at a higher excitation than the other of said dynamoelectric machines for mechanically driving said higher excitation machine by said other machine through said mechanical drives, said electrical connecting means of said machines and said main generator providing for an electrical pump-back of power from said driven machine to said other machine and for supplying the losses of the system from said main generator, means for simultaneously reversing the excitation of said machines for reversing the direction of rotation of said mechanical drives, means including an exciter for exciting said generator, and means including a field exciting winding on said exciter for limiting the maximum current supplied by said main generator.

8. In a test system for simultaneously testing a pair of mechanical drives connected together for transmitting power therebetween, a pair of dynamoelectric machines each adapted to be mechanically connected to one of said mechanical drives, means for electrically connecting both of said machines across a source of electric power supply, a field exciting winding for each of said dynamoelectric machines, means for controlling the excitation provided by said field exciting windings for operating one of said dynamoelectric machines at a higher excitation than the other of said dynamoelectric machines for driving said higher excitation machine by said other machine, said electrical connecting means of said machines to said electrical power supply providing for an electrical pump-back of power from said driven machine to said other machine and for supplying the losses of the system from said electrical power supply, speed responsive means for limiting the speed of said machines to predetermined values by limiting the supply of power from said electrical power supply, and means for simultaneously reversing the direction of rotation of said machines to reverse the rotational direction of the transfer of mechanical power through said mechanical drives.

9. In a test system for testing a pair of mechanical drives connected together for transmitting power therebetween, a pair of dynamoelectric machines each adapted to be mechanically connected to one of said mechanical drives, a main generator, means for electrically connecting both of said machines across said generator, a field exciting winding for each of said dynamoelectric machines, means for controlling the excitation provided by said field exciting windings for operating one of said dynamoelectric machines at a higher excitation than the other of said dynamoelectric machines for mechanically driving said higher excitation machine by said other machine through the mechanical drives, said electrical connecting means of said machines to said generator providing for an electrical pump-back of power from said driven machine to said other machine and said generator supplying the losses of the system, means including an exciter for exciting said generator, and means including a tachometer generator on each of said machines and a field exciting winding for providing a component of excitation to said exciter responsive to the voltage of either of said tachometer generators above a predetermined machine speed for reducing the voltage of said main generator for reducing the speed of said machines.

10. In a test system for testing a pair of mechanical drives connected together for transmitting power therebetween, a pair of dynamoelectric machines each adapted to be mechanically connected to one of said mechanical drives, means for electrically connecting both of said machines across a source of electrical power supply, a field exciting winding for each of said dynamoelectric machines, means for controlling the excitation provided by said field exciting windings for operating one of said dynamoelectric machines at a higher excitation than the other of said dynamoelectric machines for driving said higher excitation machine by said other machine, said electrical connecting means of said machines to said electrical power supply providing for an electrical pump-back of power from said driven machine to said other machine and for supplying the losses of the system from said electrical power supply, means for measuring the electrical power of each of said machines, speed responsive means for limiting the speed of said machines to predetermined values by limiting the supply of power from said electrical power supply, and means for simultaneously reversing the direction of rotation of said machines to reverse the rotational direction of the transfer of mechanical power through said mechanical drives.

11. In a test system for testing a pair of mechanical drives connected together for transmitting power therebetween, a pair of dynamoelectric machines each adapted to be mechanically connected to one of said mechanical drives, means for electrically connecting both of said machines to a source of electric power supply, a field exciting winding for each of said dynamoelectric machines, means for controlling the excitation provided by said field exciting windings for operating one of said dynamoelectric machines at a higher excitation than the other of said dynamoelectric machines for mechanically driving said higher excitation machine by said other machine through the mechanical drives, said electrical connecting means of said machines to said source of electrical power supply providing for an electrical pump-back of power from said driven machine to said other machine and said electrical power supply supplying the losses of the system, means for measuring the electrical power of each of said machines, means for simultaneously reversing the direction of rotation of said mechanical drives, speed responsive means for limiting the speed of said machines to predetermined values by limiting the supply of power from said electrical power supply, means for selectively energizing said field exciting winding of only one of said dynamoelectric machines, and means including a field exciting winding for said machines for controlling the loading on said machines.

12. In a test system for testing a pair of mechanical drives connected together for transmitting power therebetween, a pair of dynamoelectric machines each adapted to be mechanically connected to one of said mechanical drives, means for electrically connecting both of said machines to a source of electrical power supply, a field exciting winding for each of said dynamoelectric machines, means for controlling the excitation provided by said field exciting windings for operating one of said dynamoelectric machines at a higher excitation than the other of said dynamoelectric machines for mechanically driving said higher excitation machine by said other machine through said mechanical drives, said electrical connecting means of said machines to said electrical power supply providing for an electrical pump-back of power from said driven machine to said other machine and for supplying the losses of the system from said electrical power supply, means for simultaneously reversing the direction of rotation of said mechanical drives, means including a field exciting winding for said machines for controlling the loading on said machines, and speed responsive means for limiting the speed of said machines to predetermined values by limiting the supply of power from said electrical power supply.

13. In a test system for testing a pair of mechanical drives connected together for transmitting power therebetween, a pair of dynamoelectric machines each adapted to be mechanically connected to one of said mechanical drives, means including a generator for providing a source of electrical power supply, means for electrically connecting both of said machines across said generator, a field exciting winding for each of said dynamoelectric machines, means for controlling the excitation provided by said field exciting windings for operating one of said dynamoelectric machines at a higher excitation than the other of said dynamoelectric machines for mechanically driving said higher excitation machine by said other machine through the mechanical drives, said electrical connecting means of said machines to said generator providing for an electrical pump-back of power from said driven machine to said other machine and said electrical power supply supplying the losses of the system, means including an exciter for exciting said generator, means including a field exciting winding for providing a differential component of excitation to said exciter above a predetermined current supplied by said generator for limiting the generator current to a predetermined maximum value, and speed responsive means for limiting the speed of said machines to predetermined values by limiting the supply of power from said electrical power supply.

14. In a test system for testing a pair of mechanical drives connected together for transmitting power therebetween, a pair of dynamoelectric machines each adapted to be mechanically connected to one of said mechanical drives, means including a generator for providing a source of electrical power supply, means for electrically connecting both of said machines across said generator, a field exciting winding for each of said dynamoelectric machines, means for controlling the excitation provided by said field exciting windings for operating one of said dynamoelectric machines at a higher excitation than the other of said dynamoelectric machines for mechanically driving said higher excitation machine by said other machine through the mechanical drives, said electrical connecting means of said machines to said generator providing for an electrical pump-back of power from said driven machine to said other machine and said electrical power supply supplying the losses of the system, means including an exciter for exciting said generator, means including a field exciting winding for providing a differential component of excitation to said exciter above a predetermined current supplied by said generator for limiting the generator current to a predetermined maximum value.

15. In a test system for testing a pair of mechanical drives connected together for transmitting power therebetween, a pair of dynamoelectric machines each adapted to be mechanically connected to one of said mechanical drives, means for electrically connecting both of said machines to a source of electric power supply, a field exciting winding for each of said dynamoelectric machines, means for controlling the excitation provided by said field exciting windings for operating one of said dynamoelectric machines at a higher excitation than the other of said dynamoelectric machines for driving said higher excitation machine by said other machine through said mechanical drives, said electrical connecting means of said machines to said electrical power supply providing for an electrical pump-back of power from said driven machine to said other machine and for supplying the losses of the system from said electrical power supply, means for simultaneously reversing the direction of rotation of said mechanical drives, means including a field exciting winding for said machines for controlling the loading on said machines, means for measuring the electric power of each of said machines, and speed responsive means for limiting the speed of said machines to predetermined values by limiting the supply of power from said electrical power supply.

16. In a test system for testing a pair of mechanical drives connected together for transmitting power therebetween, a pair of dynamoelectric machines each adapted to be mechanically connected to one of said mechanical drives, means including a main generator for providing a source of electrical power supply, means for electrically connecting both of said machines across said main generator, a field exciting winding for each of said dynamoelectric machines, means for controlling the excitation provided by said field exciting windings for operating one of said dynamoelectric machines at a higher excitation than the other of said dynamoelectric machines for mechanically driving said higher excitation machine by said other machine through the mechanical drives, said electrical connecting means of said machines to said main generator providing for an electrical pump-back of power from said driven machine to said other machine and said electrical power supply supplying the losses of the system, means including an exciter for exciting said generator, means including a field exciting winding for providing a differential component of excitation to said exciter above a predetermined current supplied by said generator for limiting the generator current to a predetermined maximum value, and means including a tachometer generator on each of said machines and a field exciting winding for providing a component of excitation to said exciter above a predetermined machine speed for reducing the voltage of said main generator for reducing the speed of said machines.

DONALD E. GARR.
BURR S. WEAVER.